US008854965B1

(12) United States Patent
Richards

(10) Patent No.: US 8,854,965 B1
(45) Date of Patent: Oct. 7, 2014

(54) FLOW LABEL SYSTEMS AND METHODS

(75) Inventor: Christopher Richards, Ottawa (CA)

(73) Assignee: Avaya Inc., Basking Ridge, NJ (US)

( * ) Notice: Subject to any disclaimer, the term of this patent is extended or adjusted under 35 U.S.C. 154(b) by 2008 days.

(21) Appl. No.: 11/489,678

(22) Filed: Jul. 20, 2006

Related U.S. Application Data

(60) Provisional application No. 60/700,992, filed on Jul. 20, 2005.

(51) Int. Cl.
*G01R 31/08* (2006.01)
(52) U.S. Cl.
USPC .......................................................... 370/235
(58) Field of Classification Search
USPC ........................................ 370/235, 231, 236
See application file for complete search history.

(56) References Cited

U.S. PATENT DOCUMENTS

| | | | | |
|---|---|---|---|---|
| 6,084,855 | A * | 7/2000 | Soirinsuo et al. | 370/235 |
| 6,330,239 | B1 * | 12/2001 | Suzuki | 370/395.1 |
| 6,466,985 | B1 * | 10/2002 | Goyal et al. | 709/238 |
| 6,499,061 | B1 * | 12/2002 | Benayoun et al. | 709/245 |
| 6,725,380 | B1 * | 4/2004 | Forlenza et al. | 726/6 |
| 7,006,472 | B1 * | 2/2006 | Immonen et al. | 370/332 |
| 7,266,121 | B2 * | 9/2007 | Raisanen | 370/392 |
| 7,299,272 | B2 * | 11/2007 | Karjanlahti | 709/220 |
| 7,376,085 | B2 * | 5/2008 | Yazaki et al. | 370/235 |
| 2002/0133617 | A1 * | 9/2002 | Davies | 709/238 |
| 2003/0090997 | A1 * | 5/2003 | Lindstrom | 370/228 |
| 2004/0109455 | A1 * | 6/2004 | Jouppi et al. | 370/395.52 |
| 2004/0252693 | A1 * | 12/2004 | Cheriton et al. | 370/395.1 |
| 2005/0286517 | A1 * | 12/2005 | Babbar et al. | 370/389 |
| 2006/0089988 | A1 * | 4/2006 | Davie et al. | 709/225 |
| 2006/0173985 | A1 * | 8/2006 | Moore | 709/223 |

OTHER PUBLICATIONS

RFC 1809 (RFC1809) Internet RFC/STD/FYI/BCP Archives "RFC 1809—Using the Flow Label Field in IPv6" pp. 1 to 5 http://www.faqs.org/rfcs/rfc3697.html.
RFC 2460 (RFC2460) Internet RFC/STD/FYI/BCP Archives "RFC 2460—Internet Protocol, Version 6 (Ipv6) Specification" pp. 1 to 29 http://www.faqs.org/rfcs/rfc2460.html.
RFC 3697 (RFC3697) Internet RFC/STD/FYI/BCP Archives "RFC 3697—Ipv6 Flow Label Specification" pp. 1 to 8 http://www.faqs.org/rfcs/rfc1809.html.
"Ipv6 Flow Label Specification" Jarno Rajahalme, Alex Conta, Brian E. Carpenter, and Steve Deering Slides 1 to 8 http://www3.ietf.org/proceedings/02mar/slides/ipv6-11/index.html.
"Using the 20 Bit Flow Label Field in the Ipv6 Header to Indicate Desirable Quality of Service on the Internet" by Bhanu Prakash (B.E., B.M.S. College of Engineering, 2000) pp. 1 to 104 http://spot.colorado.edu/~sicker/students/bhanu.pdf#search=%22Ipv6%20Flow%20Label%22.
"IPv6 Flow Label Classifier", Submitted Mar. 5, 2003 IEEE C802.16d-03/14 Marc Engles, Jan Erreygers (LoraNet) Christian Hoymann (RWTH Aachen) pp. 0 to 1 http://ieee802.org/16/tgd/contrib/C80216d-03_14.odf#search=%22IPv6%20Flow%20Label%22.

* cited by examiner

*Primary Examiner* — Mohammad Anwar
(74) *Attorney, Agent, or Firm* — Maldjian Law Group LLC; John Maldjian; Alexander D. Walter

(57) ABSTRACT

Network edge devices receive IPv6 packets from source devices. These packets may or may not contain values in their flow label fields. The network edge devices apply a value to the flow label field. This value may include a flow identifier established by the network edge device. The value may also include an additional information element pertaining to QoS, security status, subscriber identity, content rating.

17 Claims, 8 Drawing Sheets

FLOW LABEL SYSTEMS AND METHODS

RELATED APPLICATION

This application claims the benefit of prior U.S. Provisional Application No. 60/700,992 filed Jul. 20, 2005 hereby incorporated by reference in its entirety.

FIELD OF THE INVENTION

This invention generally relates to the field of packet communication networks. More specifically the invention relates to the use of flow labels in IP packets such as IPv6 packets.

BACKGROUND OF THE INVENTION

IPv6 (Internet Protocol version 6) is a new version of the Internet Protocol that is slowly replacing IPv4 that has been in use since the early 1970's. IP packets provisioned in accordance with IPv6 include a header containing, among other things, a source address, destination address and a flow label.

Traditionally IP packets were routed solely based on the destination or source address. This was difficult, time consuming, and inefficient, particularly when there were multiple flows from the same source and going to the same destination, each flow containing multiple packets.

The IPv6 flow label, therefore, was designed to indicate flows of related packets sent from a source to a destination through a network. For example, all video streaming packets from company A to user B can be distinguished from file download traffic between company A and user B through the use of different flow labels and so can be treated differently by the network. A flow typically includes a set of IP packets with the same source, the same destination, and going from a common source port/socket to a common destination port/socket. A flow is a one way communication, with two flow being used to implement bi-directional communications. There may be multiple flows from a given end user device at a given instant.

The current IETF (Internet Engineering Task Force) specifications state that the flow label is only to be set by the source of the packets. An application or end device is the source of the packets. As a result flow labels are assigned by an unknown and untrusted entity from the network's point of view. In addition, the ability of the network to provide additional treatments such as QoS or end-user correlation to the packets is very much affected by how this entity assigns the flow label values to the packets it originates.

Therefore, both the number of flows in a network and the flow classification mechanisms used to classify flows are currently under the control of the unknown and untrusted end devices/applications.

Because the source nodes are not trusted devices, various attacks against the intermediate nodes are possible. For example, a rogue source may create a different flow label for every packet, causing the intermediate nodes to create a flow state for each packet. This could quickly exhaust the intermediate node's memory and CPU processing resources.

More specifically, intermediate nodes may make routing and other QoS decisions when processing packets containing a flow label. In order to provide flow based services, these intermediate nodes maintain a flow state for each flow being tracked. Maintaining a flow state requires memory and CPU processing. In light of these problems the use of flow labels has not be prevalent.

SUMMARY OF THE INVENTION

According to one broad aspect, the invention provides a method comprising: receiving a packet in a network node other than a source of the packet; and applying a value to a flow label of said packet.

In some embodiments, each packet has a header comprising a source address, a destination address and the flow label.

In some embodiments, each packet is an IP packet.

In some embodiments, each packet is an IPv6 packet.

In some embodiments, receiving a packet in a network node comprises receiving a packet in a network edge device.

In some embodiments, applying a value to a flow label of the packet comprises applying at least a flow identifier to the flow label of the packet.

In some embodiments, the method further comprises: generating the flow label for each packet to include a flow identifier and at least one other information element.

In some embodiments, the at least one other information element is selected from a group consisting of: QoS information; individual and/or group subscriber identifier; charging identifier information; security status; content rating; and information about an originating host device.

In some embodiments, generating the flow label comprises using some of flow label field bits to contain the at least one other information element and some of the flow label field bits to contain the flow identifier.

In some embodiments, the method further comprises: examining each incoming packet and either defining a new flow label value for the incoming packet, or associating the incoming packet with an existing flow.

In some embodiments, the method further comprises: applying a new value for the flow label for a flow after receiving several packets of the flow.

In some embodiments, applying a new value for the flow label for a flow after receiving several packets of the flow comprises defining a new flow label value after determining a content rating for the flow, the new flow label value comprising a field containing the content rating.

According to another broad aspect, the invention provides a network node comprising: at least one ingress interface card; at least one egress interface card; a flow label processor adapted to receive a packet and apply a flow label to the packet; and a routing element that routes packets between the interface cards.

In some embodiments, the network node is a network edge device.

In some embodiments, each packet is an IP packet.

In some embodiments, each packet is an IPv6 packet.

In some embodiments, the flow label processor applies a value to the flow label that comprises a flow identifier and at least one other information element.

In some embodiments, the at least one other information element is selected from a group consisting of: QoS information; individual and/or group subscriber identifier; charging identifier information; security status; content rating; and information about an originating host device.

According to another broad aspect, the invention provides a network node comprising: at least one ingress interface card; at least one egress interface card; a flow label processor adapted to receive a packet having a flow label field containing a flow identifier and at least one other information element; the network node being adapted to perform further packet processing as a function of the at least one other information element; and a routing element that routes packets between the interface cards.

In some embodiments, the at least one other information element is selected from a group consisting of: QoS information in which case performing further packet processing as a function of the at least one other information element comprises giving QoS treatment based on QoS information; individual and/or group subscriber identifier in which case performing further packet processing as a function of the at least one other information element comprises performing subscriber identity specific processing; charging identifier information in which case performing further packet processing as a function of the at least one other information element comprises performing packet accounting using the charging identifier information; security status in which case performing further packet processing as a function of the at least one other information element comprises performing packet processing having regard to the security status field; content rating in which case performing further packet processing as a function of the at least one other information element comprises performing content specific charging; and information about an originating host device.

BRIEF DESCRIPTION OF THE DRAWINGS

Preferred embodiments of the invention will now be described with reference to the attached drawings in which.

DETAILED DESCRIPTION

Figure 1:
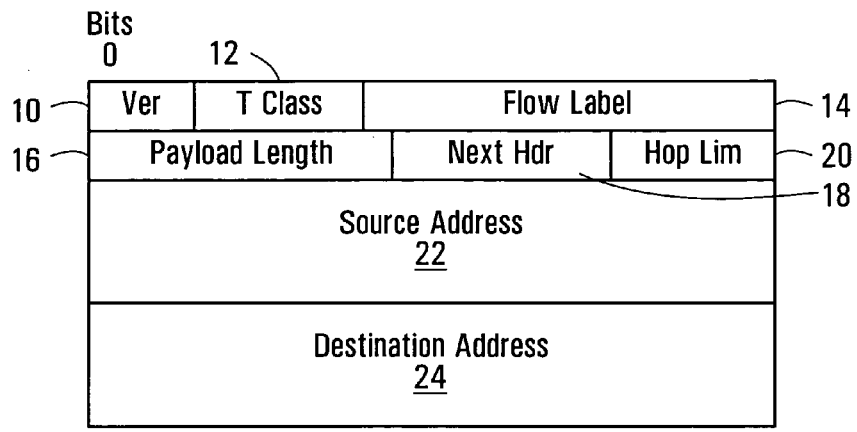
FIG. 1 is a schematic diagram of some of the fields of an IPv6 header.

RFC 3696 J. Rajahalme, A. Conta, B. Carpenter and S. Deering, "IPv6 Flow Label Specification", March 2004 is hereby incorporated by reference. FIG. 1 depicts some of the fields of an IPv6 packet header format. The fields include:

Version 10—this is a 4-bit version number of the Internet Protocol=6;

Traffic class 12—8-bit traffic class field;

Flow label 14—20-bit field;

Payload length 16—16-bit unsigned integer representing the number of bytes in the payload;

Next header 18—8-bit selector used to indicate where an inner header starts;

Hop limit 20—8-bit unsigned integer representing the maximum number of routers the packet can pass through before the packet is dropped in order to avoid problems such as endless loops;

Source IP address 22—128 bits containing the address of the initial sender of the packet; and Destination address 24—128 bits containing the address of the intended recipient of the packet.

While the embodiments are described in the context of IPv6, more generally, these can be applied to IP communications where packets have headers with fields that include a source address, a destination address and a flow label.

IPv6 Network

Figure 2:
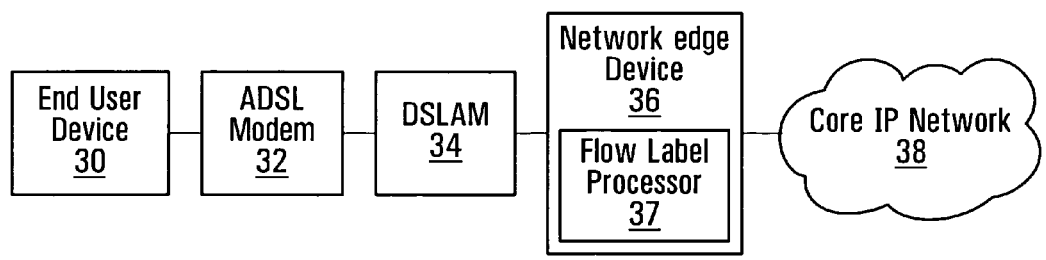
FIG. 2 is a block diagram of an example of an IPv6 network topology for subscriber DSL access.

FIG. 2 provides an example of a simplified IPv6 network topology for subscriber DSL access. Shown is an end user device 30 connected through an ADSL modem 32 through a DSLAM (Digital Subscriber Line Access Multiplexer) 34 (more generally an aggregation point) to a network edge device 36. The network edge device 36 is shown connected to a core IP network 38. The network edge device 36 has a flow label processor 37 that functions to apply a value to the flow label field of incoming packets. Various detailed examples are given below.

In operation, IP packets from the end user device 30, which in some embodiments is a subscriber PC, are sent through the ADSL modem 32 to the DSLAM 34. A transport protocol such as ATM may be used between the modem 32 and the DSLAM 34. The DSLAM 34 terminates multiple DSL connections and performs aggregation before sending traffic on to the network edge device 36. In accordance with IPv6, the subscriber PC may add a flow label to each IP packet that it sends.

The network edge device 36 receives the IP packets and forwards them on to the core IP network 38. The flow label processor 37 applies a value in the flow label field in the IP packets it received before forwarding them on to the core IP network 38. The flow label processor 37 can be implemented using software, hardware, firmware or any combination thereof. The network edge device is a physical device that receives packets and forwards them on to the core IP network 38.

It is to be understood that in a given IPv6 implementation, not necessarily all of the components of FIG. 2 will be present.

The Network Edge Device

Figure 3:
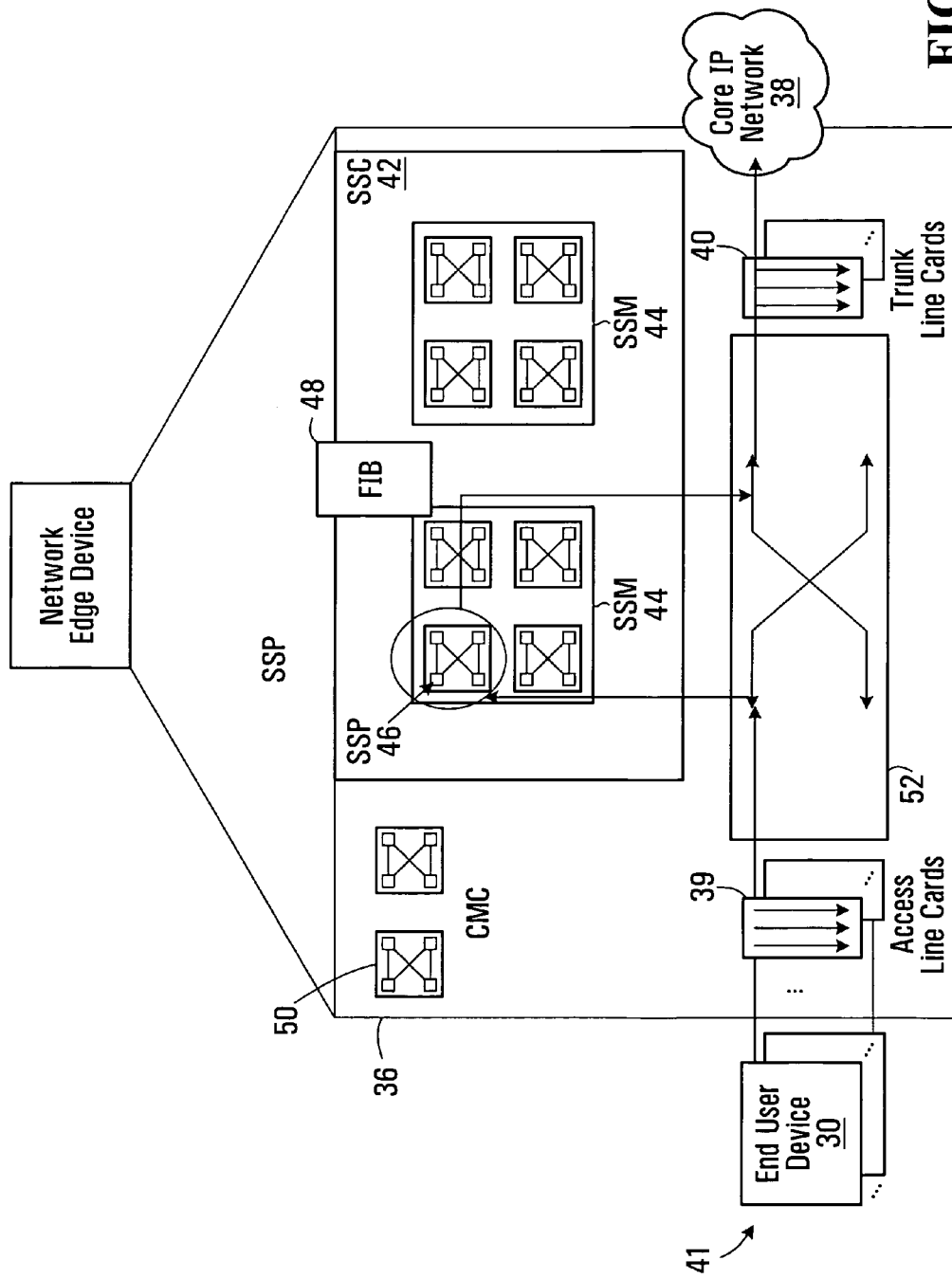
FIG. 3 is a block diagram of an example of a network edge device.

For purposes of providing further context for the broader aspects set out in the summary, and the embodiments described in this detailed description, FIG. 3 shows a logical block diagram of an example implementation of a network edge device that might be used in the IPv6 network of FIG. 2 in accordance with an embodiment of the invention.

The network edge device has access line cards 39 connected (via network infrastructure such as a DSLAM, not shown) to end user devices 41 and trunk line cards 40 connected to the core IP network 38. The end user devices 41 include end user device 30. There is a subscriber services card (SSC) 42 that has a plurality of subscriber services modules (SSM) 44 (two shown). Each SSM 44 has four subscriber services processors 46. Also shown is a forwarding information base (FIB) 48 containing packet routing information. The FIB 48 determines the next node to forward packets to for any given destination. For example, if a packet has destination Z, the FIB 48 may contain an entry "Packets destined for Z need to be sent to node B". A switch fabric 52 is shown interconnecting the access line cards 38 to the SSPs 46 and interconnecting the SSPs 46 to the trunk line cards 40. Also shown are control management cards (CMC) 50 responsible for management of the network edge device 36.

In operation, IPv6 packets enter the network edge device 36 via an access line card 39. Packets belonging to a end user device are forwarded through the switch fabric 52 to a subscriber services card 42 for processing by one of the subscriber services processors 46. The subscriber services card 42 processes each packet and determines the outgoing interface using the forwarding information database 48. The subscriber services card 42 then sends packet back through the switch fabric 52 to a trunk line card 40 and out to the core network 38. The subscriber services processors 46 perform flow label processing using any of the methods described herein.

Figure 4:
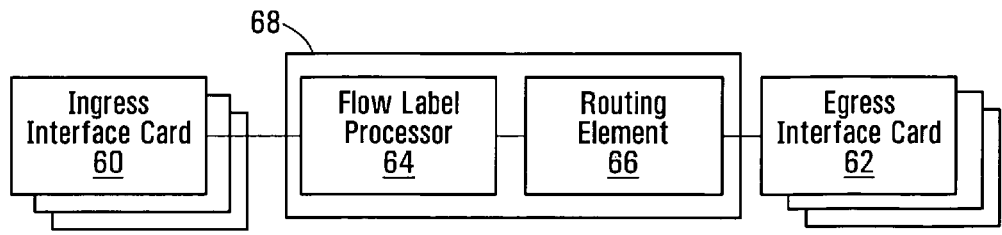
FIG. 4 is a block diagram of a network device adapted to perform flow label processing in accordance with an embodiment of the invention.

FIG. 4 is a block diagram of a network element 68 provided by an embodiment of the invention. The network element 68 has a plurality of ingress interface cards 60 and a plurality of egress interface cards 62. Depending on the nature of the network element 68, the cards may be access cards or trunk cards. The benefits of the flow label switching methods provided herein are realized to their maximum extent when the flow label switching methods are implemented in an edge device. However, the flow label switching methods could alternatively or also be implemented in other network elements. The network element 68 has a flow label processor 64 and a routing element 66.

The network node of FIG. 4 may be a network edge node or a node internal to the network such as a core router. Any of the methods described below may be implemented to perform flow label processing in the network node of FIG. 4.

For example, one or more of the methods implemented by flow label processing nodes (methods of FIGS. 5,7,9,11,13) can be implemented on such a device; it may be a network edge device in such instances, but not necessarily so. The methods described below as being implemented by network nodes to process packets containing the newly applied flow labels (for example methods of FIGS. 6,8,10,12,14 described below) can be implemented on such a device.

Flow Label Processing

IPv6 flow classification is specified to use 3-tuples from the IPv6 packet header. These are: packet source address, packet destination address and the flow label—therefore, the finest granularity for the packet flow classification is based solely on these 3 fields. Since the flow label value is currently assigned by the source of the packet according to RFC 3696, flow classification is largely entirely left to the source applications and the IPv6 implementation running in the source device. Such applications may not be designed to implement intelligent flow label assignments or may assign flow labels inappropriately.

For example, all packets from a source to the same destination may be supplied the same flow label by the source application and therefore intermediate routing nodes cannot apply more finely grained flow QoS treatments. Put another way, packets may be assigned the same flow label by the source node when really, the flow consists of multiple distinct flows, each requiring different treatment by the network. In a particular example of this, a 3GPP IMS application may apply the same flow label to all packets being sent from the application, even though the application sends flows of packets of different types (text or audio content) requiring different QoS treatment as they are transmitted in the network to the destination.

Because of the unreliability of the flow labelling performed by sources, currently, for QoS purposes, nodes need to perform their own inspection of each packet to apply packet and flow treatment. This defeats the purpose of the flow label which was to avoid having all nodes perform this type of intensive packet inspection and flow classification processing.

According to an embodiment of the invention, some network nodes are free to apply the flow label value to received packets. In some embodiments, this is done before applying any flow QoS or service. In some implementations, the network node may take into account a flow label generated by the source node. In other implementations, the network node simply ignores flow labels generated by the source node.

In some embodiments, the network nodes that apply the value in the flow label field are network nodes that provide stateful QoS treatment. "Stateful" QoS treatment means that some processing of the initial packets has taken place and some QoS treatment has been determined for all the future packets of the flow without having to perform the same processing on each packet.

According to another embodiment of the invention, some nodes providing stateful QoS treatment to IPv6 packet flows replace the flow label value in received packets before forwarding the packets to the next node in the network.

In some embodiments, the flow label is applied to network edge devices. By controlling flow labels at edge network devices, the following effects can be realized to various degrees:

(1) The number of flow label identifiers that need to be handled by the network may be controlled by the node inserting or replacing the flow label. More specifically, the situation where a rogue source applies a large number of flow labels requiring nodes to use up their memory can be avoided;

(2) Flow classification may be controlled by the node inserting or replacing the flow label. This involves the node inserting the flow label to analyze the packet, possibly looking inside the packet; after this has been done, other nodes in the network do not need to perform this exercise;

(3) The end device or application may not be aware of any flow label replacement or flow reclassification performed in the network.

Assuming that the node performing the flow labelling and classification can be trusted within the network, intermediate nodes in a network can perform flow based treatment (QoS, end-user identity correlation) based on a combination of the flow label and source/destination addresses.

Flow Label Value Redefinition or Extension

In some embodiments, the meanings of the values carried within the Flow Label field are redefined or extended in order to convey additional information regarding the packet flow. For example, the Flow Label can be used to convey QoS, security, end user or accounting information across a given service provider's network and even across network administrative boundaries. Specific detailed examples are given below. In some embodiments, a plurality of fixed structures for the flow label are defined, and one of these structures is used for each flow.

The Flow Label field may be used to convey additional information about the packet flow through a service provider's network. With appropriate agreements the modified Flow Label can be transmitted beyond the network operator's administrative boundary into a peer network.

In some embodiments, the modified Flow Label still includes a flow identifier, but a smaller number of bits are used to provide room for the additional information components. When this is the case, conventional flow-based functionality can still be performed. For example, a well understood use of flow labels is to ensure that when load balancing is performed within a network, the packets of a given flow are routed through the same path so as to avoid mis-ordering etc. This can still be done with the smaller flow identifier.

A device performing flow labelling, typically a network edge device, maintains information about all current sessions and flows in its memory. This typically includes details of the header fields. When a packet is received, the packet header fields are scanned against the list of current sessions and if a match is found then the packet is assumed to belong to that existing session and flow. In this manner, after a first packet of a flow has been assigned a flow by a flow labelling node, subsequent packets can be assigned the same flow identifier.

The following examples illustrate some uses of the modified Flow Label usage.

Use of Flow label to Communicate Quality of Service

In some embodiments, a Quality of Service indication is applied to packet flows using a subset of the bits of the flow label. In a particular example, one or more high order bits of the flow label are used to communicate QoS values. The remaining bits are used as Flow identifiers.

For example, in some embodiments Voice over IP (VoIP) media streams are assigned a common QOS value in the high order bits of the Flow Label field that is associated with a higher forwarding priority through the network. In this manner, each intermediate node that understands the QoS value can give the VoIP flows the higher forwarding priority. Each individual flow maintains a unique flow identifier in the remaining lower order bits. Best effort flows such as HTTP could be assigned a different QoS value in the high order bits of the Flow Label field.

Figure 5:
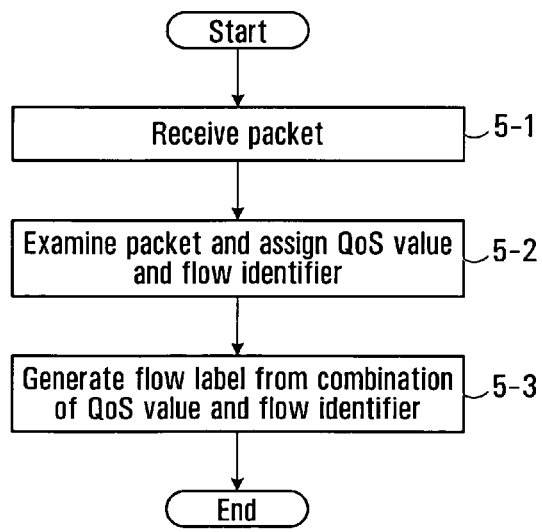
FIG. 5 is a flowchart of a method of generating and inserting flow labels from a combination of QoS values and flow identifiers.

Referring now to FIG. 5, shown is a flowchart of an example method of generating and inserting flow label values from a combination of QoS values and flow identifiers for execution by a flow labelling node such as a network edge device. The method begins with the receipt of a packet at step 5-1. At step 5-2, the flow labelling node examines the packet and assigns a QoS value and a flow identifier. At step 5-3, the flow labelling node generates and applies a flow label value that is based on the combination of the QoS value and flow identifier. This might for example be a concatenation of a series of bits representing the assigned QoS value and a series of bits representing the flow identifier.

Figure 6:
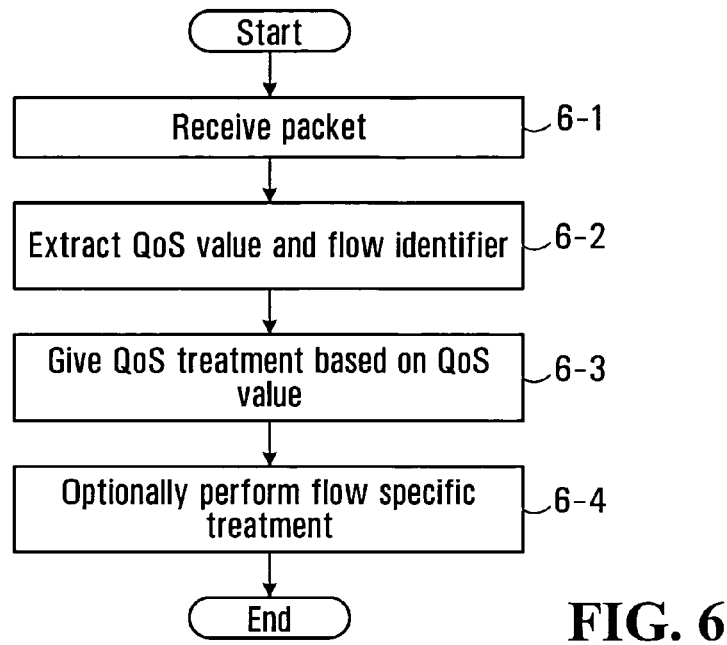
FIG. 6 is a flowchart of a method of processing packets containing flow labels generated using the method of FIG. 5.

FIG. 6 is a flowchart of an example method for execution by network nodes that receive packets containing flow labels generated using the above-summarized method. These might include routers between the flow labelling node and the final destination. The method begins at step 6-1 with the receipt of a packet containing a flow label based on a combination of a QoS value and a flow identifier. At step 6-2, the QoS value and flow identifier are extracted. At step 6-3, QoS treatment is performed based on the QoS value extracted. In some implementations, further flow-specific treatment may be performed at step 6-4.

Use of Flow Label to Communicate Subscriber Identity

There are numerous services that would benefit from the correlation of either individual subscriber or classes of subscriber to packets in order to provide a customized service for end users. For example, while subscriber awareness is often maintained at the network edge node, a URL content filtering engine is typically implemented elsewhere in the network not necessarily in the same logical or physical element where the subscriber identity is maintained.

In another embodiment, the flow label is used to communicate subscriber identity information that might identify individual subscriber and/or group of subscribers, for example with a subscriber class. This information can be used by other nodes within the network, for example URL content filtering services. In this case the URL content classification may be performed by a network element that is logically and/or physically separated from the network element where the subscriber identity is maintained. By communicating subscriber identity with each packet of a flow, the content classification element can correlate URL requests to a subscriber or group of subscribers to make policy decisions.

In a particular example, some number of bits of the flow label, for example four of the high order bits of the Flow Label, are used to identify a class of subscription for the subscriber (Gold, Silver, Bronze and none). A content classification element may allow or block HTTP requests based upon the URL and the class of subscription since subscriber or subscriber group information is communicated along with the HTTP URL request. In a particular example, the edge node, being aware of the subscriber, assigns a content subscription indicator to the 4 bits of the flow label (e.g. 1=gold, 2=silver, etc). The packets are then forwarded to a content classification element which actually classifies the URL request. With the classification of the URL and the subscription indicator in the flow label, the content classifier has enough information to either allow the request or block it. For example, if the content classification for the URL was "allowed for Gold subscribers only" and the subscription indicator in the flow label was "silver", then it would know that it needs to block the URL request.

Figure 7:
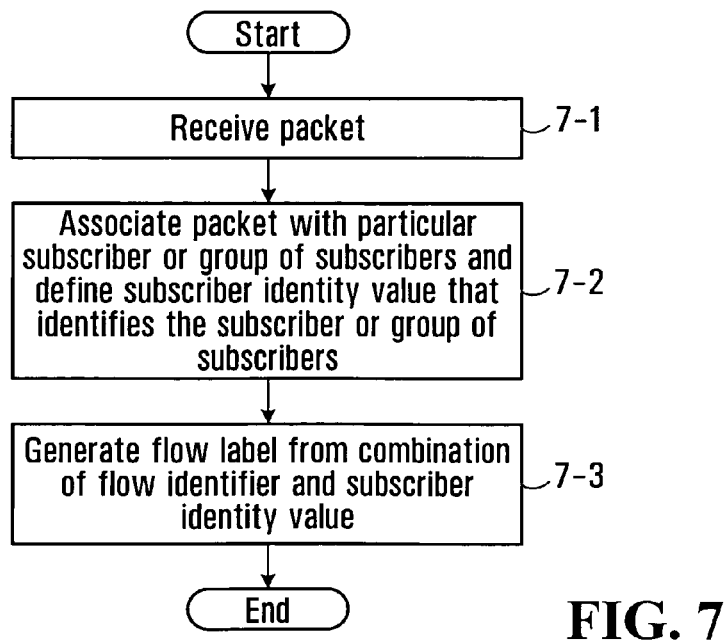
FIG. 7 is a flowchart of a method of generating and inserting flow labels from a combination of a flow identifier and a subscriber identity field.

FIG. 7 is a flowchart of an example method how a flow labelling node such as a network edge device might process packets to generate and insert flow labels from a combination of a flow identifier and a subscriber identifier value. The method begins with a receipt of a packet at step 7-1. At step 7-2, the packet is associated with a particular subscriber or group of subscribers. A subscriber identity value is defined that identifies the subscriber or group of subscribers. At step 7-3, a flow label is generated and applied into the packet. The flow label is based on a combination of the flow identifier and the subscriber identity value.

Figure 8:
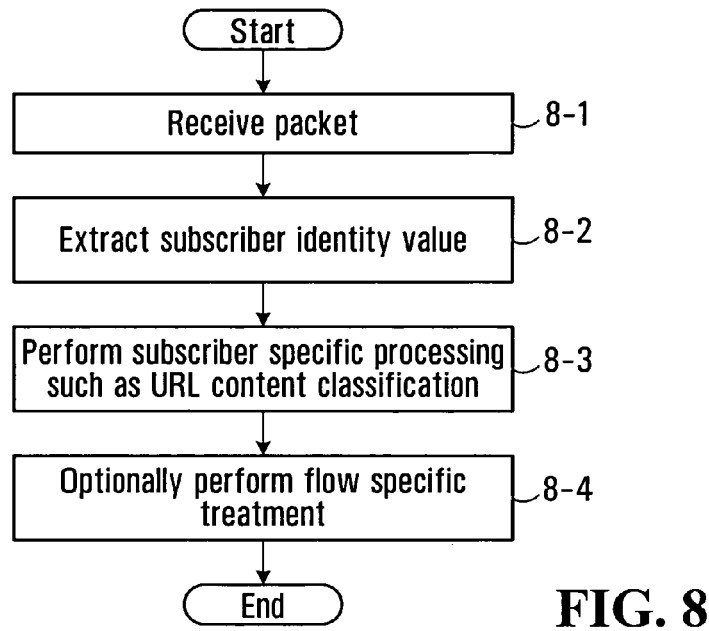
FIG. 8 is a flowchart of a method of processing packets containing a flow label generated in accordance with the method of FIG. 7.

FIG. 8 is a flowchart of an example method of packet processing by network nodes such as routers in processing packets that contain flow labels that are based on a combination of the flow identifier and subscriber identity value. The method begins at step 8-1 with the receipt of a packet. It continues at step 8-2 with the extraction of the subscriber identity value. At step 8-3, subscriber-specific processing such as URL content classification is performed. Optionally, at step 8-4 further flow-specific treatment is performed on the basis of the flow identifier contained in the flow label.

Use of Flow Labels to Communicate Security/Authentication Status & Policy

In another embodiment, a flow labelling node such as a network edge device applies security services to packet flows. Examples of security services that may be performed include virus detection or detection of other malicious threats. In this embodiment, the network edge node includes information regarding the security status of a packet flow in part of the Flow Label so that other downstream network elements can take appropriate actions.

Figure 9:
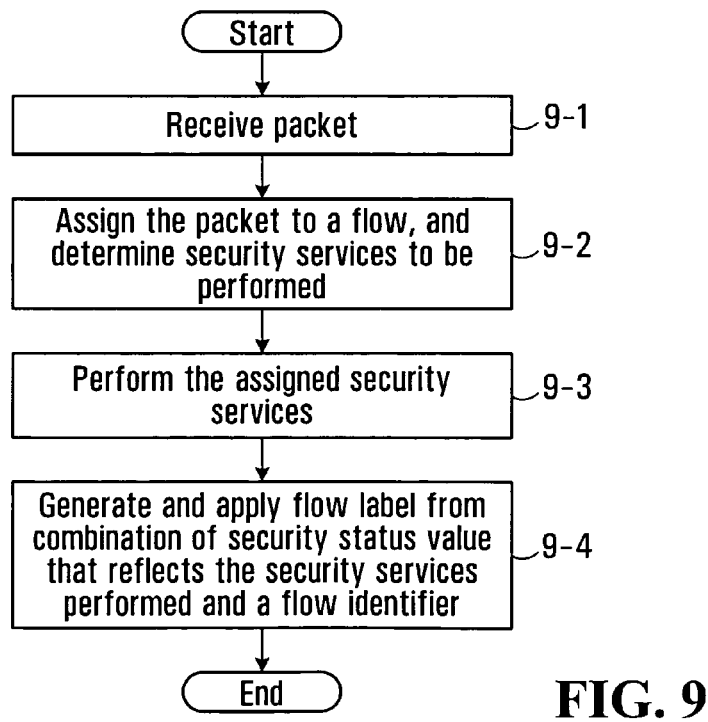
FIG. 9 is a flowchart of a method of generating and inserting flow labels based on a combination of a security status field and a flow identifier.
Figure 10:
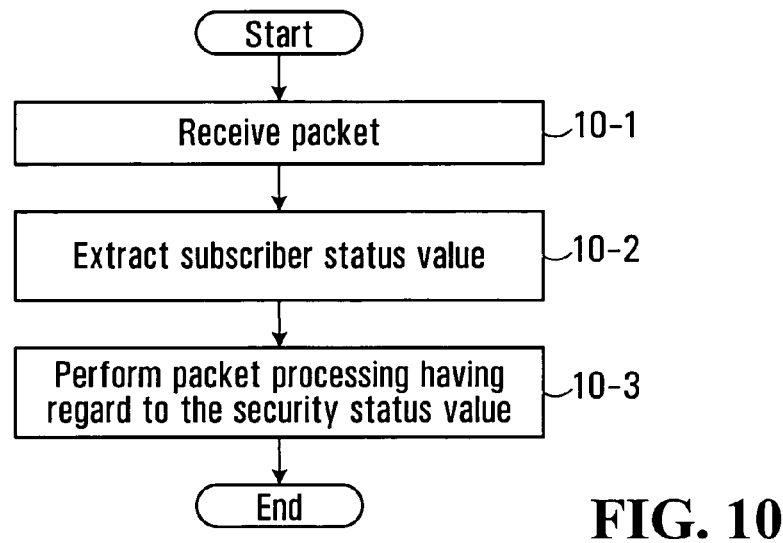
FIG. 10 is a flowchart of a method of processing packets containing flow labels generated in accordance with the flowchart of FIG. 9.

Referring now to FIG. 9, shown is a flowchart of an example method of generating and inserting flow labels that are based upon a combination of security status and flow identifier. The method begins with the receipt of a packet at step 9-1. The method continues at step 9-2 with the assignment of the packet to a flow and the determination of security services to be performed for the packet. At step 9-3, the assigned security services are performed. At step 9-4, a flow label is generated and applied from a combination of a security status value and a flow identifier. The security status field reflects the security services performed FIG. 10 is a flowchart of a method performed by network nodes to process packets containing a flow label generated and inserted in accordance with the method of FIG. 9. The method begins at step 10-1 with the receipt of a packet. At step 10-2, the security status value is extracted. At step 10-3, packet processing is performed having regard to the security status field. For example, seeing that another node has included a security status indicator, this node does not have to perform any security processing on the packet because it has already been done by a previous node. In some embodiments, a flow labelling node or another network node may go further and indicate the flow contains a threat that is applicable to a particular class of end user devices (for example devices using a particular user operating system). Now, if another edge node that forwards packets to the destination knows that the destination machine does not belong to that class (for example knows the device is using a different operating system—it may know this because it is directly connected to the server), that edge node does not have to worry about the threat.

More generally, in some embodiments, the flow label is used to encode information about the originating host device. Examples of such information include the Operating System referred to above, CPU and manufacturer. This may be useful information for other network nodes to know so that they can adapt their behaviour based upon that information.

Use of Flow Label to Communicate Charging & Accounting Information

In another embodiment, the Flow Label is used to communicate charging identifier information for a packet flow between network elements. In some implementations this can avoid the use of additional charging information correlation methods that are traditionally employed. For example, in 3GPP networks, the GGSN node at the ingress point to the IP network generates a charging identifier for packets based upon charging policy rules enforced by the GGSN. The GGSN produces charging records that can be used for generating subscriber billing and accounting records and network statistics. However, intermediate nodes in a network or in a peer network are not currently able to correlate packet flows to this charging identifier in real-time. By communicating charging identifier information with each packet of the flow, intra- and inter-network accounting can be correlated in real-time.

Figure 11:
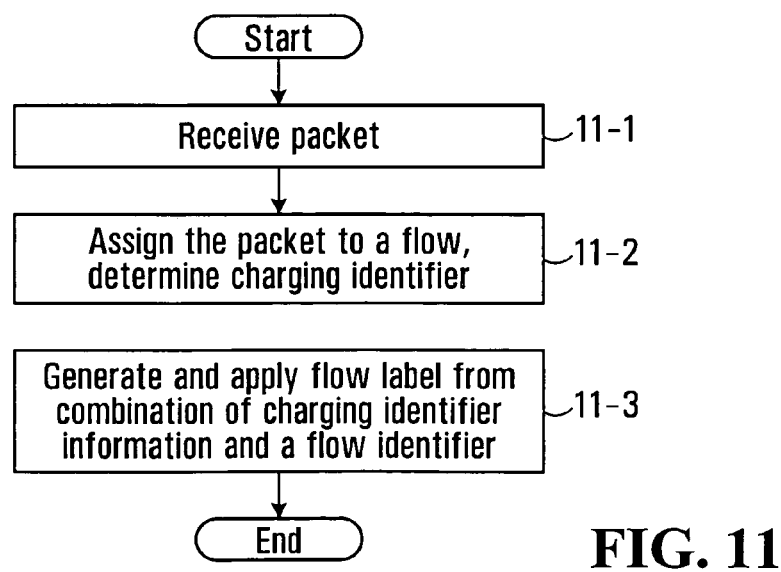
FIG. 11 is a flowchart of a method of generating and inserting flow labels based on a combination of charging identifier information and a flow identifier.

FIG. 11 is a flowchart of an example method of generating and inserting flow labels that are based upon a combination of a charging identifier information and a flow identifier. The method begins at step 11-1 with the receipt of a packet, for example at a network edge device. At step 11-2, the packet is assigned to a flow, and a charging identifier for the flow is determined. At step 11-3, a flow label is generated and applied that is based upon a combination of the charging identifier information and a flow identifier.

Figure 12:
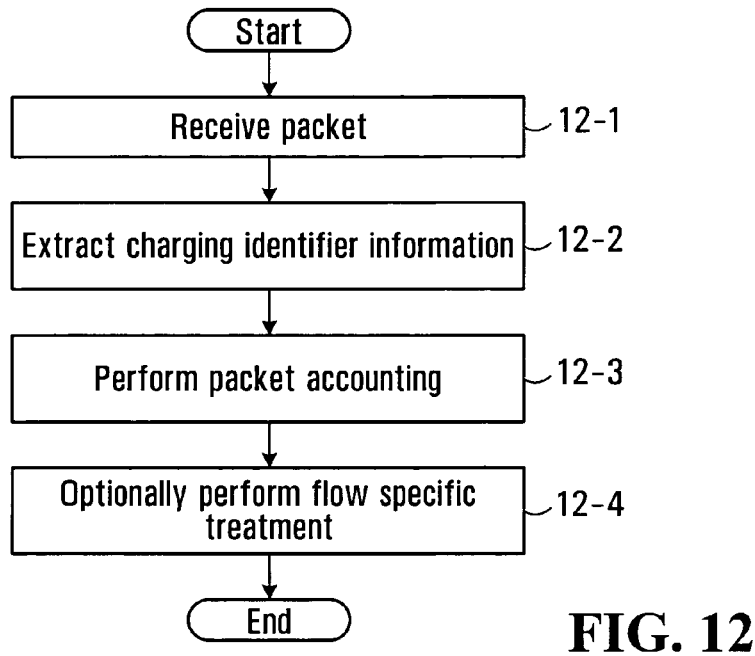
FIG. 12 is a flowchart of a method of processing packets containing flow labels generated in accordance with the method of FIG. 11.

FIG. 12 is a flowchart of an example of a method performed by network nodes to process packets containing flow labels based on a combination of the charging identifier information and flow identifier. The method begins at step 12-1 with the receipt of a packet. A step 12-2, the charging identifier information is extracted; at step 12-3, packet accounting is performed using the extracted charging identifier information. Optionally, at step 12-4 further flow-specific treatment is performed on the basis of the flow identifier.

Use of Flow Label to Communicate Content Rating Information

In some embodiments, content rating is used to differentiate end user use of network resources for the purpose of charging based upon the nature of the traffic. For example VoIP traffic may be charged differently from web browsing traffic.

Figure 13:
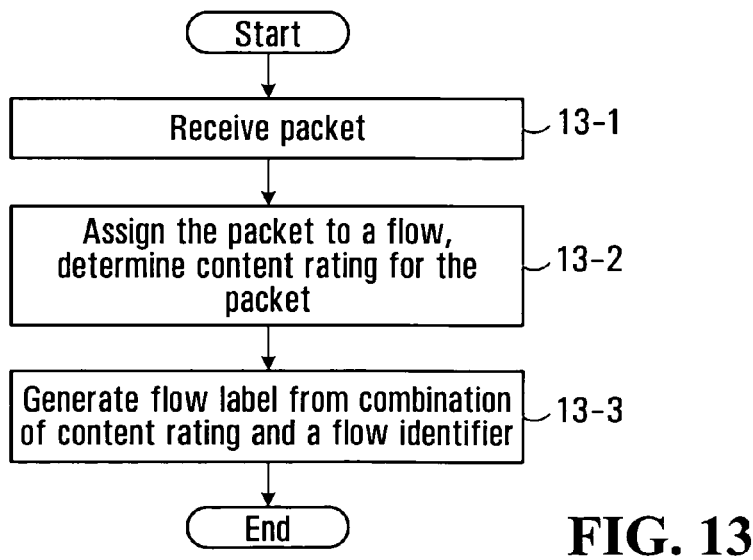
FIG. 13 is a flowchart of a method of generating and inserting flow labels from a combination of content rating and flow identifiers.

FIG. 13 is a flowchart of an example of a method performed by a flow labelling node to generate and insert flow labels based on a combination of content rating and flow identifiers. The method begins with the receipt of a packet at step 13-1, for example at a network edge device. At step 13-2, the packet is assigned to a flow and a content rating is determined for the packet. At step 13-3, a flow label is generated and applied that is based upon the combination of the content rating and the flow identifier.

Figure 14:
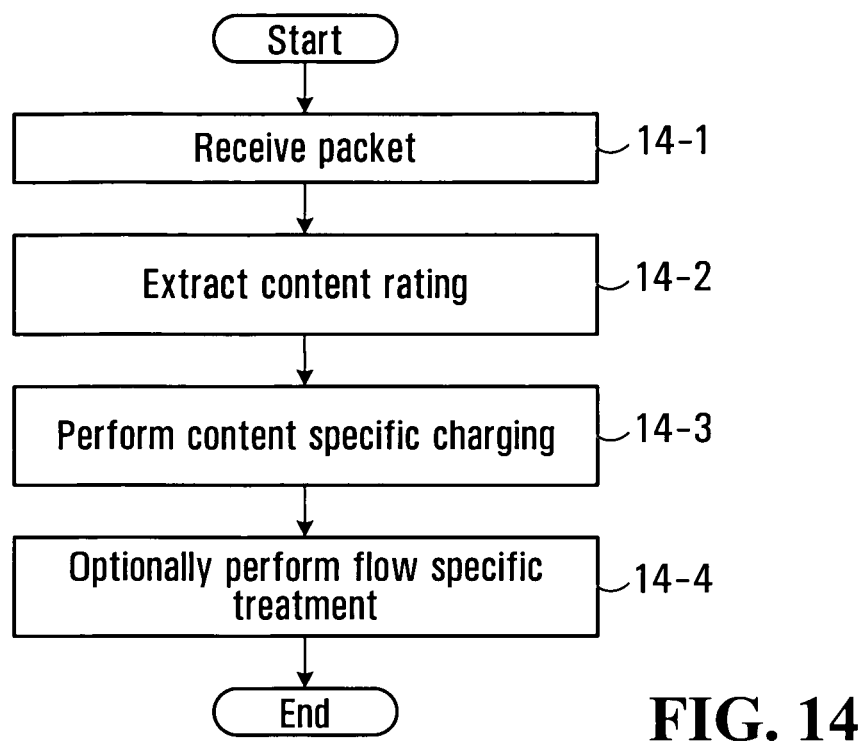
FIG. 14 is a flowchart of a method of processing packets containing flow labels generated using the method of FIG. 13.

FIG. 14 is a flowchart of an example of a method performed by network nodes to process packets containing flow labels that are based upon the combination of content rating and flow identifier. The method begins at step 14-1 with the receipt of a packet. It continues at step 14-2 with the extraction of content rating information. At step 14-3, content-specific charging is implemented on the basis of the extracted content rating. Optionally, at step 14-4 further flow-specific treatment can be performed on the basis of the flow identifier.

The above-described embodiments assume that a network edge node will set the flow label and that it will not change for the duration of the flow. In other embodiments, the flow label is changed during a packet flow either by the edge node that set the flow label initially or by an intermediate node. For example, an edge or intermediate element wishing to set the Flow Label field value, may do so after some initial packets have already been received and forwarded to their destination and two way communication has been established between the originating host or application and the destination. For example, when a network node is performing deep packet inspection for the purpose of applying content rating, the rating engine may need to inspect the packet payload of multiple packets before the flow can be rated accurately. In this situation, the content rate bits of the Flow Label may be modified during the packet flow once a rating decision has been made.

In a particular example, the flow label value may be initially set to a value of 0 (zero) during TCP connection establishment, but set to a non-zero value once application level information is communicated, for example once a HTTP URL request has been rated.

Various examples of combining a flow identifier with a single additional information element have been presented. In some embodiments, the flow identifier is combined with multiple additional information elements.

Numerous modifications and variations of the present invention are possible in light of the above teachings. It is therefore to be understood that within the scope of the appended claims, the invention may be practiced otherwise than as specifically described herein.

What is claimed is:

1. A method comprising:
   receiving a first packet of a flow in a network node other than a source of the first packet, the first packet having an old value for a flow label;
   generating a new value for the flow label for the first packet, the new value comprising a combination of a flow identifier and at least one other information element, wherein the new value is different than the old value;

applying, at the network node, the new value to the flow label of said first packet;

forwarding, by the network node, the first packet with the new value for the flow label;

receiving, at the network node, a second packet of the flow, the second packet having an old value for a flow label;

assigning a new value for the flow label for the second packet, the new value comprising a combination of the flow identifier generated for the first packet and at least one other information element, wherein the new value is different than the old value;

applying, at the network node, the new value to the flow label of said second packet; and forwarding, by the network node, the second packet with the new value for the flow label.

2. The method of claim 1 wherein the packet has a header comprising a source address, a destination address and the flow label.

3. The method of claim 2 wherein the packet is an IP packet.

4. The method of claim 3 wherein the packet is an IPv6 packet.

5. The method of claim 1 wherein receiving the packet in the network node comprises receiving a packet in a network edge device.

6. The method of claim 1 wherein the at least one other information element is selected from a group consisting of:
QoS information;
individual and/or group subscriber identifier;
charging identifier information;
security status;
content rating; and
information about an originating host device.

7. The method of claim 1 wherein generating the new value for the flow label comprises using some of flow label field bits to contain the at least one other information element and some of the flow label field bits to contain the flow identifier.

8. The method of claim 1 further comprising:
examining the packet and either defining the new flow label value for the packet, or
associating the packet with an existing flow.

9. The method of claim 1 further comprising:
applying the new value for the flow label for a flow after receiving several packets of the flow.

10. The method of claim 9 wherein applying the new value for the flow label for the flow after receiving several packets of the flow comprises defining the new flow label value after determining a content rating for the flow, the new flow label value comprising a field containing the content rating.

11. A network node comprising:
at least one ingress interface card;
at least one egress interface card;
a flow label processor adapted:
to receive a first packet of a flow having an old value for a flow label field;
to generate a new value for the flow label field, the new value comprising a flow identifier and at least one other information element;
to apply the new value for the flow label field to the first packet;
to forward the first packet with the new value for the flow label field;
to receive a second packet of the flow having an old value for a flow label field;
to generate a new value for the flow label field, the new value comprising the flow identifier generated for the first packet and at least one other information element;
to apply the new value for the flow label field to the second packet; and
to forward the second packet with the new value for the flow label field; and
a routing element that routes the packet between the interface cards as a function of the applied flow label.

12. The network node of claim 11, wherein the network node is a network edge device.

13. The network node of claim 11 wherein the packet is an IP packet.

14. The network node of claim 13 wherein the packet is an IPv6 packet.

15. The network node of claim 11 wherein the at least one other information element is selected from a group consisting of:
QoS information;
individual and/or group subscriber identifier;
charging identifier information;
security status;
content rating; and
information about an originating host device.

16. A network node comprising:
at least one ingress interface card;
at least one egress interface card;
a flow label processor adapted to receive a first packet and a second packet of a flow, having a respective old value for a flow label field, the old value comprising a flow identifier and at least one other information element;
the network node being adapted to perform further processing of the first packet and the second packet as a function of the respective at least one other information element, to produce a new value for the respective flow label field, wherein the flow identifier of the second packet is the same as the flow identifier of the first packet; and
a routing element that routes the packet between the interface cards as a function of the new value for the flow label field and at least one other information element.

17. The network node of claim 16 wherein the at least one other information element is selected from a group consisting of:
QoS information in which case performing further packet processing as a function of the at least one other information element comprises giving QoS treatment based on QoS information;
individual and/or group subscriber identifier in which case performing further packet processing as a function of the at least one other information element comprises performing subscriber identity specific processing;
charging identifier information in which case performing further packet processing as a function of the at least one other information element comprises performing packet accounting using the charging identifier information;
security status in which case performing further packet processing as a function of the at least one other information element comprises performing packet processing having regard to the security status field;
content rating in which case performing further packet processing as a function of the at least one other information element comprises performing content specific charging; and
information about an originating host device.

* * * * *